United States Patent [19]

Krishnan

[11] Patent Number: 5,924,026
[45] Date of Patent: Jul. 13, 1999

[54] EXCHANGE OF SYSTEM AND TERMINAL CAPABILITIES OVER THE SAME ANALOG CONTROL CHANNEL

[75] Inventor: Arjun Krishnan, Richardson, Tex.

[73] Assignee: Nokia Mobile Phones Limited, Espoo, Finland

[21] Appl. No.: 08/811,274

[22] Filed: Mar. 4, 1997

[51] Int. Cl.⁶ ................................................. H04Q 7/20
[52] U.S. Cl. .................... 455/414; 455/434; 455/403; 455/550
[58] Field of Search .................................. 455/403, 414, 455/415, 422, 423–425, 426, 433, 434, 550, 552, 561

[56] References Cited

U.S. PATENT DOCUMENTS

| | | | |
|---|---|---|---|
| 5,255,307 | 10/1993 | Mizikovsky | 455/552 |
| 5,396,653 | 3/1995 | Kivari et al. | 455/88 |
| 5,412,375 | 5/1995 | Wood | 340/825.03 |
| 5,430,740 | 7/1995 | Kivari et al. | 371/37.1 |
| 5,524,278 | 6/1996 | Williams et al. | 455/552 X |
| 5,570,353 | 10/1996 | Keskitalo et al. | 370/18 |
| 5,577,024 | 11/1996 | Malkamaki et al. | 370/18 |
| 5,600,707 | 2/1997 | Miller, II | 455/434 X |
| 5,606,548 | 2/1997 | Vayrynen et al. | 370/252 |
| 5,655,003 | 8/1997 | Erving et al. | 455/426 X |
| 5,734,980 | 3/1998 | Hooper et al. | 455/434 |
| 5,745,860 | 4/1998 | Kallin | 455/574 |
| 5,761,623 | 6/1998 | Lupien et al. | 455/552 |
| 5,784,693 | 6/1998 | Barber et al. | 455/434 |
| 5,794,147 | 8/1998 | Huang | 455/434 |

*Primary Examiner*—Dwayne D. Bost
*Assistant Examiner*—William G. Trost
*Attorney, Agent, or Firm*—Perman & Green, LLP

[57] ABSTRACT

A method for exchanging protocol support information between a base station and a mobile station over an analog control channel. The method includes a first step of transmitting from a base station information specifying at least one protocol supported by the base station over a first analog control channel. A next step includes receiving the information transmitted by the base station at a mobile station. In response to receiving this information, a next step is performed of transmitting information which specifies at least one protocol supported by the mobile station, from the mobile station to the base station, over a second analog control channel.

34 Claims, 14 Drawing Sheets

FIG. 1
PRIOR ART
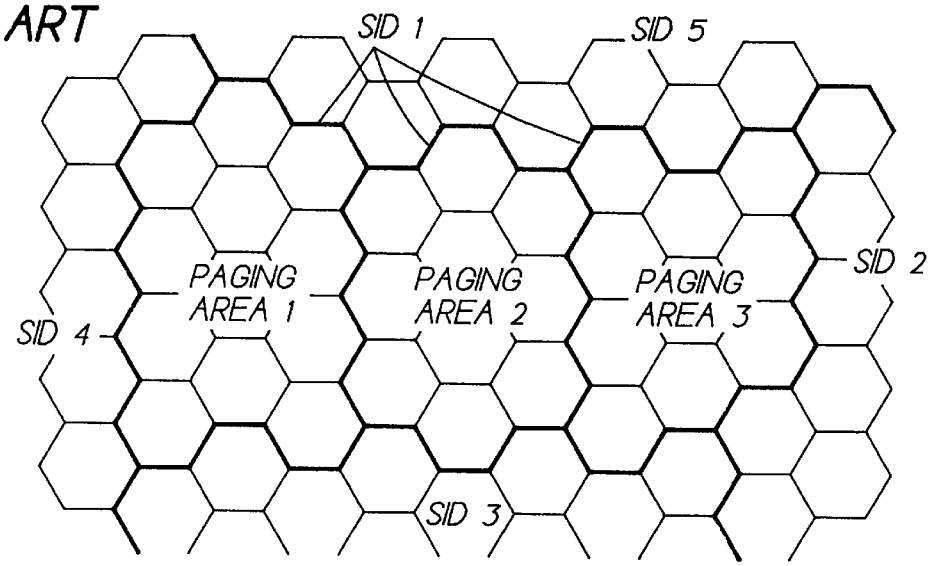
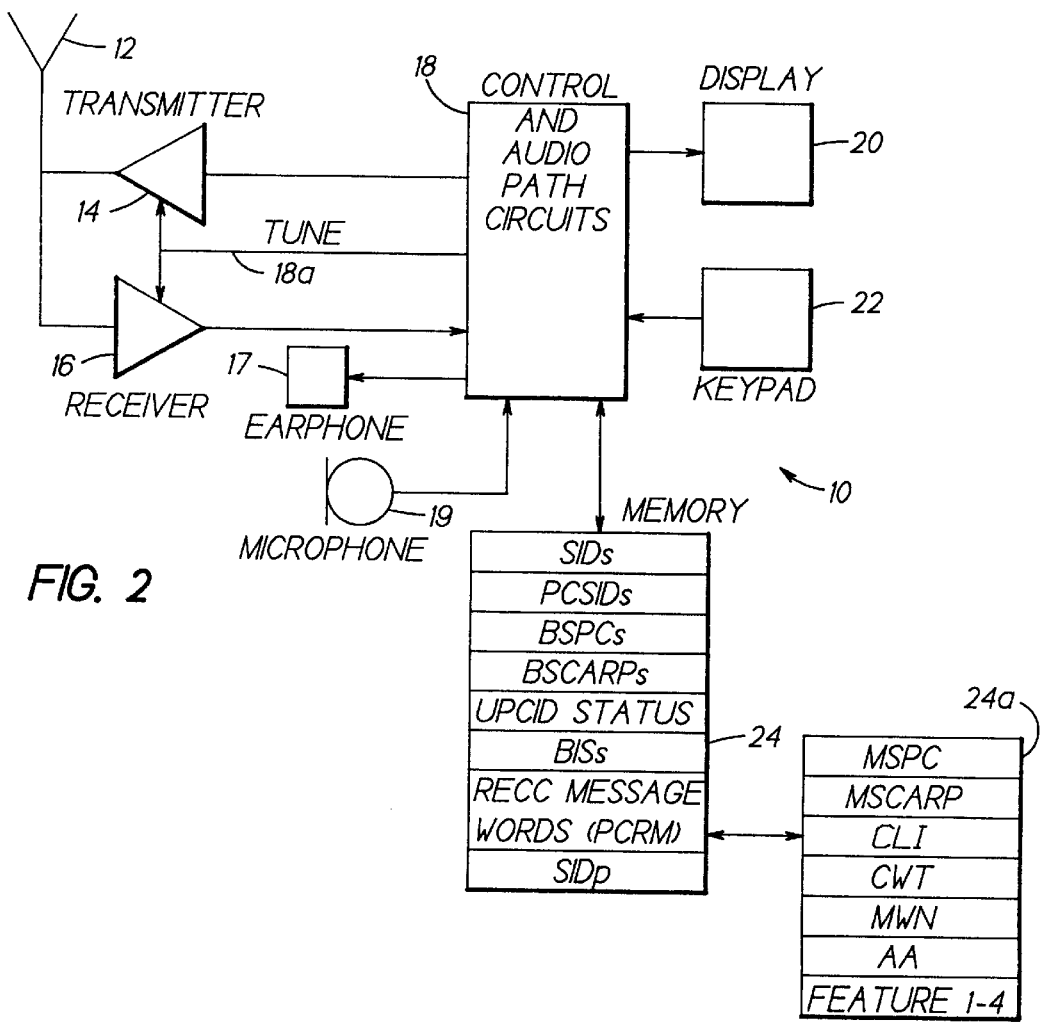
FIG. 2

FIG. 5a
PRIOR ART   RESCAN GLOBAL ACTION MESSAGE

| T1T2 = 11 | DCC | ACT= 0001 | RSVD = 000...00 | END | OHD= 100 | P |
|---|---|---|---|---|---|---|
| 2 | 2 | 4 | 16 | 1 | 3 | 12 |

FIG. 5b
PRIOR ART   REGISTRATION INCREMENT GLOBAL ACTION MESSAGE

| T1T2 = 11 | DCC | ACT= 0010 | REGINCR | RSVD = 0000 | END | OHD =100 | P |
|---|---|---|---|---|---|---|---|
| 2 | 2 | 4 | 12 | 4 | 1 | 3 | 12 |

FIG. 5c
PRIOR ART   LOCATION AREA GLOBAL ACTION MESSAGE

| T1T2 = 11 | DCC | ACT =0011 | PUREG | PDREG | LREG | RSVD =0 | LOCAID | END | OHD= 100 | P |
|---|---|---|---|---|---|---|---|---|---|---|
| 2 | 2 | 4 | 1 | 1 | 1 | 1 | 12 | 1 | 3 | 12 |

FIG. 5d
PRIOR ART   NEW ACCESS CHANNEL SET GLOBAL ACTION MESSAGE

| T1T2 = 11 | DCC | ACT= 0110 | NEWACC | RSVD = 00000 | END | OHD =100 | P |
|---|---|---|---|---|---|---|---|
| 2 | 2 | 4 | 11 | 5 | 1 | 3 | 12 |

FIG. 5e
PRIOR ART   OVERLOAD CONTROL GLOBAL ACTION MESSAGE

| T1T2 = 11 | DCC | ACT= 1000 | OLC0 | OLC1 | OLC2 | OLC3 | OLC4 | OLC5 | OLC6 | OLC7 |
|---|---|---|---|---|---|---|---|---|---|---|
| 2 | 2 | 4 | 1 | 1 | 1 | 1 | 1 | 1 | 1 | 1 |

| OLC8 | OLC9 | OLC10 | OLC11 | OLC12 | OLC13 | OLC14 | OLC15 | END | OHD= 100 | P |
|---|---|---|---|---|---|---|---|---|---|---|
| 1 | 1 | 1 | 1 | 1 | 1 | 1 | 1 | 1 | 3 | 12 |

FIG. 5f PRIOR ART ACCESS TYPE PARAMETERS GLOBAL ACTION MESSAGE

| T1T2 = 11 | DCC | ACT = 1001 | BIS | RSVD = 000...0 | END | OHD = 100 | P |
|---|---|---|---|---|---|---|---|
| 2 | 2 | 4 | 1 | 15 | 1 | 3 | 12 |

FIG. 5g PRIOR ART ACESS ATTEMPT RARAMETERS GLOBAL ACTION MESSAGE

| T1T2 = 11 | DCC | ACT = 1010 | MAXBUSY-PGR | MAXSZTR-PGR | MAXBUSY-OTHER | MAXSZTR-OTHER | END | OHD = 100 | P |
|---|---|---|---|---|---|---|---|---|---|
| 2 | 2 | 4 | 4 | 4 | 4 | 4 | 1 | 3 | 12 |

FIG. 5h PRIOR ART RANDOM CHALLENGE A GLOBAL ACTION MESSAGE

| T1T2 = 11 | DCC | ACT = 0111 | RAND1_A | END | OHD = 100 | P |
|---|---|---|---|---|---|---|
| 2 | 2 | 4 | 16 | 1 | 3 | 12 |

FIG. 5i PRIOR ART RANDOM CHALLENGE B GLOBAL ACTION MESSAGE

| T1T2 = 11 | DCC | ACT = 1011 | RAND1_B | END | OHD = 100 | P |
|---|---|---|---|---|---|---|
| 2 | 2 | 4 | 16 | 1 | 3 | 12 |

FIG. 5j PRIOR ART LOCAL CONTROL 1 MESSAGE

| T1T2 = 11 | DCC | ACT = 1110 | LOCAL CONTROL | END | OHD = 100 | P |
|---|---|---|---|---|---|---|
| 2 | 2 | 4 | 16 | 1 | 3 | 12 |

FIG. 5K PRIOR ART LOCAL CONTROL 2 MESSAGE

| T1T2 = 11 | DCC | ACT = 1111 | LOCAL CONTROL | END | OHD = 100 | P |
|---|---|---|---|---|---|---|
| 2 | 2 | 4 | 16 | 1 | 3 | 12 |

FIG. 6a
PRIOR ART  WORD A-ABBREVIATED ADDRESS WORD

| F=1 | NAWC | T | S | E | ER | SCM (3-0) | MIN1 23-0 | P |
|---|---|---|---|---|---|---|---|---|
| 1 | 3 | 1 | 1 | 1 | 1 | 4 | 24 | 12 |

FIG. 6b
PRIOR ART  WORD B-EXTENDED ADDRESS WORD

| F=0 | NAWC | LOCAL/ MSG_TYPE | ORDQ | ORDER | LT | EP | SCM(4) | MPCI |
|---|---|---|---|---|---|---|---|---|
| 1 | 3 | 3 | 3 | 5 | 1 | 1 | 1 | 2 |

| SDCC1 | SDCC2 | MIN2 33-24 | P |
|---|---|---|---|
| 2 | 2 | 10 | 12 |

FIG. 6c
PRIOR ART  WORD C-SERIAL NUMBER WORD

| F=0 | NAWC | SERIAL | P |
|---|---|---|---|
| 1 | 3 | 32 | 12 |

FIG. 6d
PRIOR ART  WORD E-SECOND WORD OF THE CALLED-ADDRESS

| F=0 | NAWC | 9th DIGIT | 10th DIGIT | ... | ... | ... | ... | 15th DIGIT | 16th DIGIT | P |
|---|---|---|---|---|---|---|---|---|---|---|
| 1 | 3 | 4 | 4 | 4 | 4 | 4 | 4 | 4 | 4 | 12 |

FIG. 6e
PRIOR ART   WORD C-AUTHENTICATION WORD

| F = 0 | NAWC | COUNT | RANDC | AUTHR | P |
|---|---|---|---|---|---|
| 1 | 3 | 6 | 8 | 18 | 12 |

FIG. 6f
PRIOR ART
WORD C-UNIQUE CHALLENGE ORDER CONFIRMATION WORD

| F = 0 | NAWC | RSVD=0...0 | AUTHU | P |
|---|---|---|---|---|
| 1 | 3 | 14 | 18 | 12 |

FIG. 6g
PRIOR ART   WORD C-BASE STATION CHALLENGE WORD

| F = 0 | NAWC | RANBS | P |
|---|---|---|---|
| 1 | 3 | 32 | 12 |

FIG. 6h
PRIOR ART   WORD D-FIRST WORD OF THE CALLED-ADDRESS

| F = 0 | NAWC | 1st DIGIT T | 2nd DIGIT | ... | ... | ... | ... | 7th DIGIT | 8th DIGIT | P |
|---|---|---|---|---|---|---|---|---|---|---|
| 1 | 3 | 4 | 4 | 4 | 4 | 4 | 4 | 4 | 4 | 12 |

FIG. 6i
PRIOR ART   WORD F-THIRD WORD OF THE CALLED-ADDRESS

| F = 0 | NAWC | 17th DIGIT T | 18th DIGIT | ... | ... | ... | ... | 23rd DIGIT | 24th DIGIT | P |
|---|---|---|---|---|---|---|---|---|---|---|
| 1 | 3 | 4 | 4 | 4 | 4 | 4 | 4 | 4 | 4 | 12 |

FIG. 6j
PRIOR ART   WORD G-FOURTH WORD OF THE CALLED-ADDRESS

| F = 0 | NAWC = 000 | 25th DIGIT T | 26th DIGIT | ... | ... | ... | ... | 31st DIGIT | 32nd DIGIT | P |
|---|---|---|---|---|---|---|---|---|---|---|
| 1 | 3 | 4 | 4 | 4 | 4 | 4 | 4 | 4 | 4 | 12 |

FIG. 9a
ACCESS TYPE PARAMETERS GLOBAL ACTION MESSAGE

| T1T2 =11 | DCC | ACT= 1001 | BIS | BSPC | BSCARP | RSVD | END | OHD =100 | P |
|---|---|---|---|---|---|---|---|---|---|
| 2 | 2 | 4 | 1 | 5 | 3 | 7 | 1 | 3 | 12 |

FIG. 9b
WORD A-ABBREVIATED ADDRESS WORD

| F=1 | NAWC | T | S | E | ER | SCM (3-0) | MIN1$_{23-0}$ | P |
|---|---|---|---|---|---|---|---|---|
| 1 | 3 | 1 | 1 | 1 | 1 | 4 | 24 | 12 |

FIG. 9c
WORD B-EXTENDED ADDRESS WORD

| F=0 | NAWC | MSGTYPE | ORDQ | ORDER | LT | EP | SCM(4) | MPCI |
|---|---|---|---|---|---|---|---|---|
| 1 | 3 | 5 | 3 | 5 | 1 | 1 | 1 | 2 |

| SDCC1 | SDCC2 | MIN2$_{33-24}$ | P |
|---|---|---|---|
| 2 | 2 | 10 | 12 |

FIG. 9d
WORD C-AUTHENTICATION WORD

| F = 0 | NAWC | COUNT | RANDC | AUTHR | P |
|---|---|---|---|---|---|
| 1 | 3 | 6 | 8 | 18 | 12 |

FIG. 9e
WORD C-FIRST WORD OF PROTOCOL CAPABILITY REGISTRATION MESSAGE

| F=0 | NAWC | MSPC | MSCARP | CLI | CWT | MWN | AA |
|---|---|---|---|---|---|---|---|
| 1 | 3 | 5 | 3 | 1 | 1 | 1 | 1 |

| RSVD | FEATURE 4 | FEATURE 3 | FEATURE 2 | FEATURE 1 | P |
|---|---|---|---|---|---|
| 16 | 1 | 1 | 1 | 1 | 12 |

FIG. 10a
ACCESS TYPE PARAMETERS GLOBAL ACTION MESSAGE

| T1T2 =11 | DCC | ACT= 1001 | BIS | BSPC = 10110 | BSCARP = 001 | RSVD | END | OHD =100 | P |
|---|---|---|---|---|---|---|---|---|---|
| 2 | 2 | 4 | 1 | 5 | 3 | 7 | 1 | 3 | 12 |

FIG. 10b
WORD A-ABBREVIATED ADDRESS WORD

| F = 1 | NAWC | T | S= 0 | E | ER | SCM (3-0) | MIN1 $_{23-0}$ | P |
|---|---|---|---|---|---|---|---|---|
| 1 | 3 | 1 | 1 | 1 | 1 | 4 | 24 | 12 |

FIG. 10c
WORD B-EXTENDED ADDRESS WORD

| F = 0 | NAWC | MSGTYPE =11000 | ORDQ =011 | ORDER | LT | EP | SCM(4) | MPCI |
|---|---|---|---|---|---|---|---|---|
| 1 | 3 | 5 | 3 | 5 | 1 | 1 | 1 | 2 |

| SDCC1 | SDCC2 | MIN2 $_{33-24}$ | P |
|---|---|---|---|
| 2 | 2 | 10 | 12 |

FIG. 10d
WORD C-AUTHENTICATION WORD

| F = 0 | NAWC | COUNT | RANDC | AUTHR | P |
|---|---|---|---|---|---|
| 1 | 3 | 6 | 8 | 18 | 12 |

FIG. 10e
WORD C-FIRST WORD OF PROTOCOL CAPABILITY REGISTRATION MESSAGE

| F = 0 | NAWC | MSPC = 00000 | MSCARP = 001 | CLI = 1 | CWT = 0 | MWN = 1 | AA = 0 |
|---|---|---|---|---|---|---|---|
| 1 | 3 | 5 | 3 | 1 | 1 | 1 | 1 |

| RSVD | FEATURE = 1 | P |
|---|---|---|
| 19 | 1 | 12 |

EXCHANGE OF SYSTEM AND TERMINAL CAPABILITIES OVER THE SAME ANALOG CONTROL CHANNEL

FIELD OF THE INVENTION

This invention relates generally to cellular telephones and, in particular, to mobile radiotelephones, also referred to herein as mobile stations, that exchange protocol information with a cellular system.

BACKGROUND OF THE INVENTION

In U.S. Pat. No. 5,020,091 there is described a cellular telephone communications system that includes multiple cells covering a geographical area, such as a metropolitan area. To the base station of each cell a number of frequencies are assigned, with some of the assigned frequencies being specified as control channels used for reciprocal identification between the telephones and the system. The location of the dedicated control channels in the cell's frequency spectrum identifies the type of cellular system, A or B (see, for example, EIA/TIA-553). A metropolitan area typically has one of each type of system.

In a cellular system of most interest to this invention the channel from a base station to the mobile station is referred to as the forward channel, i.e., the forward control channel and the forward voice channel. The channel from the mobile station to the base station is referred to as the reverse channel, i.e., the reverse control channel and the reverse voice channel.

Base stations can transmit various messages over the forward control channel including, by example, mobile station control messages, overhead messages (e.g., Overhead Message Trains (OMTs)), and control-filler messages. Mobile station control messages are transmitted by a base station when paging or sending orders to a mobile station (see, e.g., EIA/TIA-553 Sec. 3.6.2.2 and Sec. 3.6.2.3). Overhead Message Trains are frequently transmitted by base stations. The OMT includes a System Parameter Overhead Message (SPOM), and may also include one or more Global Action Overhead Messages (GAOMs). The SPOM always contains System Identification (SID) information. The SID is unique for each cellular system. The use of the SID enables the cellular phone to determine whether it is using its home system or whether it is roaming. According to current standards (e.g., EIA/TIA-553), the SPOM is transmitted every 800±300 ms, and the GAOMs are transmitted on an as needed basis.

Also according to current standards (e.g., EIA/TIA-553-A), GAOMs can include a Rescan Global Action Message (RGAM), a Registration Increment Global Action Message (RIGAM), a Location Area Global Action Message (LAGAM), a New Access Channel Set Global Action Message (NACSGAM), an Overload Control Global Action Message (OCGAM), an Access Type Parameters Global Action Message (ATPGAM), and Access Attempt Parameters Global Action Message (AAPGAM), a Random Challenge A Global Action Message (RCAGAM), a Random Challenge B Global Action Message (RCBGAM), a Local Control 1 Message (LC1M), and a Local Control 2 Message (LC2M). Exemplary formats of these messages, as in accordance with EIA/TIA-553-A, are shown in FIGS. 5a–5k, respectively.

A base station transmits OMTs to a mobile station in order to, by example, support the mobile station when it is executing the Initialization Task (see, e.g., EIA/TIA-553 Sec. 3.6.1 and Sec. 2.6.1), control the mobile station while it is monitoring a control channel (see, e.g., EIA/TIA-553 Sec. 3.6.2.1), and to support system access by the mobile station (see, e.g., EIA/TIA-553 Sec. 3.6.3.1).

To support system access by the mobile station, the base station transmits various messages in the OMT over the forward control channel (see, e.g., EIA/TIA-553-A Sec. 3.6.3.1). A first message is the Digital Color Code (DCC) message, which, after being transmitted from the base station to the mobile station, is used by the mobile station to identify to the base station which base station transmitter the mobile station is receiving. A second message includes the Control Mobile Attenuation Code (CMAC), which is transmitted from the base station in a control-filler message if the mobile station needs to adjust its transmitter power level before accessing the system on a reverse control channel. A third message includes the Wait-For Overhead Message (WFOM), which specifies whether or not the mobile station must wait to receive an OMT before accessing the system on a reverse control channel. Another message includes the Overload Control (OLC) message, which is appended to the SPOM if the mobile station must not access the cellular system for originations on the reverse control channel. Another message includes the Access Attempts Parameters Message (AAPM), which is appended to the SPOM to indicate that default values must not be used for a number of seizure attempts or the limit on the number of busy occurrences for the mobile station accessing the reverse control channel. A further message is the Access Type Parameters Global Action Message (ATPGAM). The ATPGAM indicates whether or not the mobile station must check for an idle-to-busy status transition on the reverse control channel when accessing a system.

Although a base station can transmit various types of messages to a mobile station over the forward control channel, current standards (e.g., EIA/TIA-533, EIA/TIA-553-A, IS-91, IS-95, and IS-136) for the analog mode do not include protocols for enabling the base station to notify the mobile station of the air-interface protocol version (e.g., AMPS) and the core analog roaming protocol version supported by the base station. By example, as can be seen in view of FIGS. 5a–5k, none of the GAOMs of EIA/TIA-553-A include data fields which specify air-interface protocol or core analog roaming standard information. As a result, if the mobile station is not able to be notified of the air-interface protocol version and the core analog roaming standard supported by the base station, the mobile station may originate messages that are not capable of being processed by the base station.

Current standards (e.g., EIA/TIA-533, EIA/TIA-553-A, IS-91, IS-95, and IS-136) also do not include protocols for enabling the mobile station operating in the analog mode to notify the base station of the air-interface protocol version, the core analog roaming protocol version, and the capability features (e.g., Call Waiting, Calling Line Identification) supported/not supported by the mobile station. By example, according to current standards (e.g., EIA/TIA 553), the types of messages that may be transmitted by a mobile station over the reverse control channel can include a page response message, an origination message, an order confirmation message, and an order message. The messages may consist of the words shown in FIGS. 6a–6j. FIG. 6a shows data fields of an Abbreviated Address Word (Word A), and FIG. 6b shows data fields of an Extended Address Word (Word B). FIG. 6c shows data fields of a Serial Number Word (Word C). FIG. 6d shows data fields of Second Word of the Called-Address (Word E), and FIG. 6e shows data fields of an Authentication Word (Word C). A Unique Challenge Order Confirmation Word (Word C) is shown in FIG. 6f, and a Base Station Challenge Word (Word C) is shown in FIG. 6g. FIG. 6h shows data fields of a First Word of the Called Address (Word D), and FIG. 6i shows data fields of a Third Word of the Called Address (Word F) Also, FIG. 6j shows data fields of a Fourth Word of the Called-Address (Word G). As can be appreciated, none of these words include data fields which indicate the version of the air-interface protocol version supported by the mobile station, the core analog roaming protocol version supported by the mobile station, or the capability features supported/not supported by the mobile station.

Being that capability feature information and air-interface/core analog roaming protocol version information cannot be provided from a mobile station to a base station operating in the analog mode in accordance with conventional standards, cellular systems cannot differentiate between mobile stations that can process certain messages and those that cannot process these messages. Also, certain information such as, for example, Calling Line/Number Identification can be delivered by the base station to the mobile station using specific protocols, such as, for example, the Alert with information protocol or the Extended Protocol Calling Line Identification protocol. Unfortunately, however, since current standards for the analog mode do not enable the mobile station to notify the base station of the capability features supported by the mobile station, the base station has no way of determining the correct protocol to use in order to deliver the Calling Line/Number Identification to the mobile station. If the base station transmits a message to the mobile station, and the mobile station does not have the capability of processing the message, undesirable consequences can result. For example, the mobile station may not execute the message and/or a call may not be delivered to a user.

As is depicted in FIG. 1, a typical cellular network is divided into a number of regions (e.g., SID1–SID5) each having contiguous radio cells (shown nominally as hexagons). One region or SID may also include one or more paging areas, each encompassing one or more radio cells.

OBJECT OF THE INVENTION

It is an object of this invention to provide a method for exchanging air-interface protocol version information and core analog roaming protocol version information between a mobile station and a cellular system.

It is another object of this invention to provide a method for enabling a mobile station to notify a base station of capability features that are supported/not supported by the mobile station.

SUMMARY OF THE INVENTION

The foregoing and other problems are overcome and the objects of the invention are realized by a method for exchanging protocol support information between a base station and a mobile station. The method includes a first step of transmitting from a base station information specifying at least one protocol supported by the base station. The information includes an ATPGAM having a format that is in accordance with the invention. Preferably, the ATPGAM includes information specifying a predefined air-interface protocol supported by the base station such as, by example, EIA/TIA 553 and earlier revisions, IS-54A, EIA/TIA 627, IS-54B (dual-mode), IS-95a (dual-mode), IS-136a (dual-mode), EIA/TIA 691 (dual-mode), or later revisions of these standards. Also, the ATPGAM preferably includes information specifying a predefined core analog roaming protocol supported by the base station such as, by example, EIA/TIA-553 and earlier revisions, EIA/TIA-533 A, or later revisions of these standards.

A next step includes receiving at the mobile station the information transmitted by the base station. In response to receiving this information, the mobile station transmits a Protocol Capability Registration Message (PCRM), which specifies at least one protocol supported by the mobile station, to the base station. In accordance with a preferred embodiment of the invention, the PCRM specifies the air-interface protocol and the core analog roaming protocol supported by the mobile station. These protocols may include, for example, any of those mentioned above, or later revisions thereof. Also in the preferred embodiment of the invention, the PCRM includes information specifying capability features that are supported or not supported by the mobile station. By example, depending on the particular capability features supported by the mobile station, the PCRM may indicate that the mobile station supports or does not support core analog features such as Calling Line Identification (CLI), Call Waiting (CWT), Message Waiting Notification (MWN), and splash ringing via abbreviated alert. Also by example, the PCRM may indicate that the mobile station supports or does not support various dual-mode functions.

In accordance with a preferred embodiment of the invention, the mobile station does not respond to the ATP-GAM received from the base station if the mobile station determines that a PCRM was previously transmitted from the mobile station to the base station in response to the mobile station previously receiving an ATPGAM from the base station.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 illustrates a portion of a conventional cellular service area comprised of multiple SIDs, multiple paging areas within a SID, and multiple cells within a paging area;

FIG. 2 is a block diagram of a radio telephone subscriber unit, or mobile station, that is constructed and operated in accordance with this invention;

FIGS. 5a–5k show formats of Global Action Overhead Messages (GAOMs) according to the prior art;

FIGS. 6a–6j illustrate formats of reverse control channel (RECC) words in accordance with the prior art;

FIG. 9a illustrates the format of an Access Type Parameters Global Action Message (ATPGAM) in accordance with the invention;

FIGS. 9b–9e illustrate words of a Protocol Capability Registration Message (PCRM) in accordance with the invention;

FIG. 10a illustrates the format of an exemplary ATPGAM in accordance with the invention;

FIGS. 10b–10e illustrate the format of an exemplary PCRM in accordance with the invention.

DETAILED DESCRIPTION OF THE INVENTION

Figure 3:
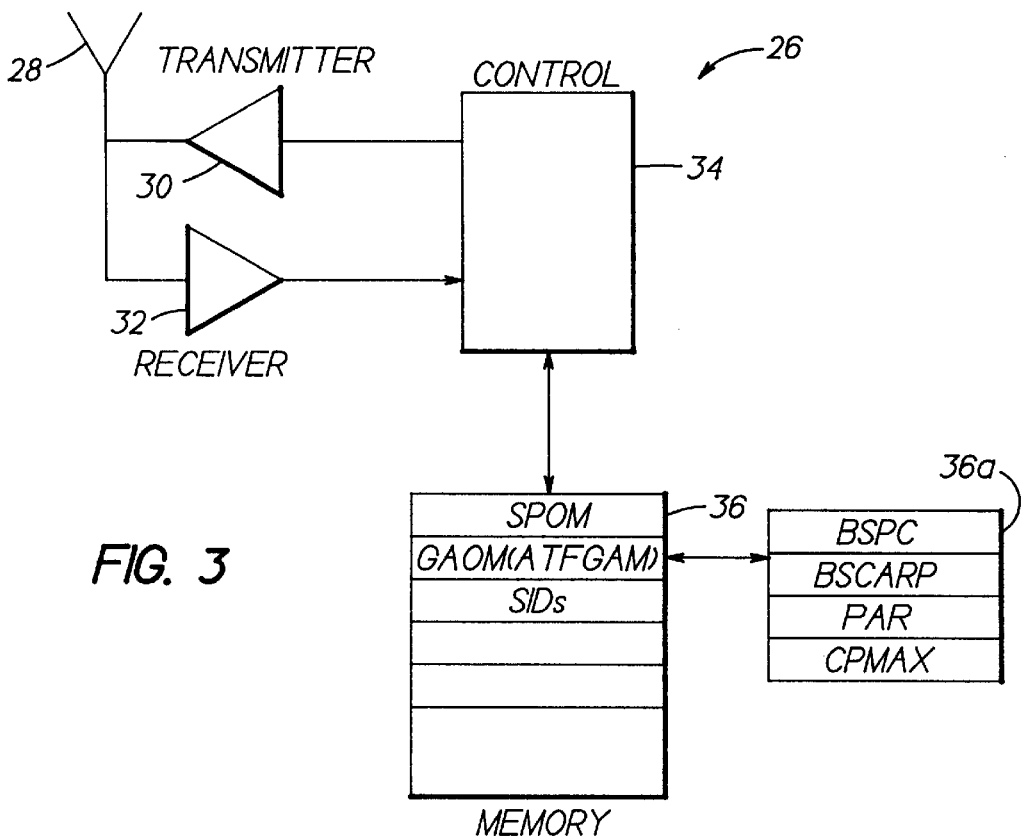
FIG. 3 is a block diagram of a cellular system base station that is constructed and operated in accordance with this invention.

Reference is made to FIG. 3 for illustrating a base station 26 that is suitable for practicing this invention. The base station 26 includes an antenna 28 for transmitting signals to and for receiving signals from a mobile station. To this end the base station includes a transmitter 30, a receiver 32, and a controller 34 that provides signals to and receives signals from the transmitter 30 and receiver 32, respectively. These signals include signalling information in accordance with the air interface of the cellular system (e.g., EIA/TIA-553 or IS-91).

The base station 26 also includes a memory 36 that includes a sub-memory 36a. Within the memory 36 and sub-memory 36a are stored a plurality of constants and variables that are used by the controller 18 during the operation of the base station. For example, the memory 36 stores the value of one or more SIDs, including the base station's home SID. The memory 36 also stores message information used in overhead messages. By example, the memory 36 stores Global Action Overhead Message (GAOM) information. This information includes an Action Type Parameters Global Action Message (ATPGAM) which has been modified in accordance with the invention to include information in addition to that provided in the prior art ATPGAM of FIG. 5f (the ATPGAM of FIG. 5f includes data fields labelled "T1T2", "DCC", "ACT", "BIS", "END", "OHD", and "P"). The format and data fields of the ATPGAM in accordance with a presently preferred embodiment of the invention are shown in Table 1 and FIG. 9a. The number of bits per data field is also shown in Table 1 and FIG. 9a. As can be seen in view of Table 1 and FIG. 9a, in addition to the data fields labelled "T1T2", "DCC", "ACT", "BIS", "END", "OHD", and "P", the ATPGAM includes Base Station Protocol Capability (BSPC) information, and Base Station Core Analog Roaming Protocol (BSCARP) information. A reserved (RSVD) field is also shown in Table 1 and FIG. 9a. The BSPC and BSCARP information is stored in sub-memory 36a.

Figure 4A:
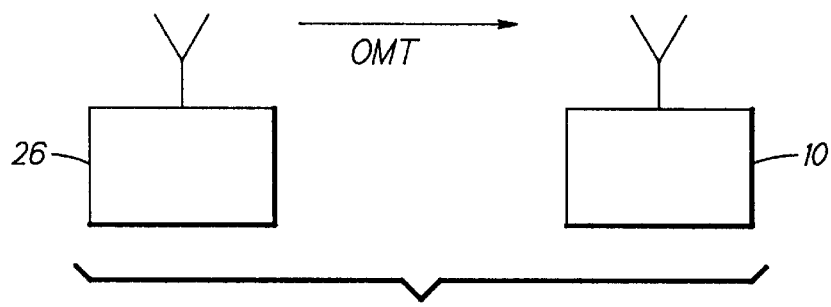
FIG. 4a illustrates an Overhead Message Train (OMT) being transmitted from a base station to a mobile station.

The BSPC information and the BSCARP information indicate the air-interface protocol version(s) supported by the base station 26 and the version(s) of the core analog roaming standard supported by the base station 26, respectively. By transmitting this information as part of the ATPGAM of an Overhead Message Train (OMT) (see FIG. 4a), the base station 26 can indicate to a mobile station 10 the air-interface protocol version(s) and the core analog roaming standard version(s) supported by the base station 26, as will be further described below.

TABLE 1

Access Type Parameters Global Action Message

| FIELD | LENGTH (BITS) |
| --- | --- |
| T1T2 = 11 | 2 |
| DCC | 2 |
| ACT = 1001 | 4 |
| BIS | 1 |
| BSPC | 5 |
| BSCARP | 3 |
| RSVD | 7 |
| END | 1 |
| OHD = 100 | 3 |
| P | 12 |

According to a presently preferred embodiment of the invention, the data fields of the ATPGAM in accordance with the invention may be interpreted as follows:

T1T2—Type field (set to '11' to indicate an overhead word) (see, e.g., EIA/TIA 553 Sec. 3.7.1.2.2);

DDC—Digital Color Code field (see, e.g., EIA/TIA 553 Sec. 3.7.1.2.2);

ACT—Global Action field (set to '1001' to indicate ATPGAM; see, e.g., EIA/TIA 553 Table 3.7.1-4);

BIS—Base-Idle Status field (see, e.g., EIA/TIA 553 Sec. 3.7.1.2.2);

BSPC—Base Station Protocol Capability field (possible air-interface protocol versions supported by the base station):

00000—ANSI EIA/TIA 553 and earlier revisions, or IS-54A,

00001—ANSI EIA/TIA 627 or IS-54B dual-mode,

00010—IS-95a dual-mode,

01100—IS-136a dual-mode,

10110—ANSI EIA/TIA 691 dual-mode, (other values are reserved);

BSCARP—Base Station Core Analog Roaming Protocol field (possible versions of core analog roaming protocol supported):

000—EIA/TIA-553 and earlier revisions,

001—EIA/TIA-533 A, (other values are reserved);

END—End indication field (indicates the last word of the OMT if set to '1', and indicates a word that is not the last word of the OMT if set to '0') (see, e.g., EIA/TIA 553 Sec. 3.7.1.2.2);

OHD—Overhead message type field (set to '100' to indicate the Global Action Message) (see, e.g., EIA/TIA 553 Sec. 3.7.1.2.2); and P—Parity field (see, e.g., EIA/TIA 553 Sec. 3.7.1.2.2).

Referring now to FIG. 2, the mobile station 10 that is suitable for practicing this invention is shown. The mobile station 10 includes an antenna 12 for transmitting signals to and for receiving signals from a cell site or base station 26 (FIG. 3) of one of the cells illustrated in FIG. 1. To this end the mobile station includes a transmitter 14, a receiver 16, and a controller 18 that provides signals to and receives signals from the transmitter 14 and receiver 16, respectively. These signals include signalling information in accordance with the air interface of the cellular system (e.g., EIA/TIA-553 or IS-91) , and also user speech and/or user generated data.

It should be understood that the mobile station 10 can be a vehicle mounted or a handheld device. It should further be appreciated that the mobile station 10 can be capable of operating with two or more air interface standards, modulation types, and access types. By example, the mobile station may be capable of operating in accordance with a frequency modulated (FM), frequency division multiple access (FDMA) transmission and reception standard, such as is found in conventional 800 MHz public cellular systems (e.g., EIA/TIA-553), and improvements and modifications thereof. For a dual mode mobile station, operation may also occur as well, when operating on an analog control channel, with a phase modulated (PM), time division multiple access (TDMA) standard (such as EIA/TIA IS-136 or GSM), or a code division multiple access (CDMA) standard (such as EIA/TIA IS-95). Narrow-band AMPS (NAMPS), as well as TACS phones, may also benefit from the teaching of this invention.

A user interface includes a conventional earphone 17, a conventional microphone 19, a display 20, and a user input device, typically a keypad 22, all of which are coupled to the controller 18. The mobile station 10 also includes a memory 24 which includes a sub-memory 24a. In the memory 24 and sub-memory 24a are stored a plurality of constants and variables that are used by the controller 18 during the operation of the mobile station. For example, the memory 24 stores the value of one or more SIDs, including the mobile station's home SID (stored as $SID_p$) and/or a SID received in an OMT (stored as variable $SID_s$). The memory 24 also stores a value of a busy-idle status ($BIS_s$) indicator, including a busy-idle status (BIS) value received in an ATPGAM of an OMT. The values stored in sub-memory 24a will be described below.

The memory 24 also stores Protocol Capability System Identification (PCSID) information (stored as variable $PCSID_s$), which indicates the SID of the system to which the mobile station 10 last sent a Protocol Capability Registration Message (PCRM) (to be described below). Furthermore, the memory 24 stores values of BSPC and BSCARP received by the mobile station 10 in an ATPGAM of an OMT. These values are stored in memory 24 as variables $BSPC_s$ and $BSCARP_s$, respectively. The memory 24 farther stores information relating to an Update Protocol Capability Identifier (UPCID). The UPCID indicates whether mobile station 10 should transmit a Protocol Capability Registration Message (PCRM) upon returning to an idle state. A UPCID status of 'enabled' indicates that the mobile station 10 should transmit a PCRM upon returning to the idle state, and a UPCID status of 'disabled' indicates that the mobile station 10 should not send a PCRM upon returning to the idle state. The manner in which these variables are used in the invention will be further described below.

The memory 24 also stores reverse control channel (RECC) message information. By example, and in accordance with this invention, the memory 24 stores information relating to the Protocol Capability Registration Message (PCRM). According to a presently preferred embodiment of the invention, and referring to FIGS. 9b–9e, the Protocol Capability Registration Message includes at least three words, namely, a Word A which includes an Abbreviated Address Word, a Word B which includes an Extended Address Word, and a Word C which includes a First Word of the Protocol Capability Registration Message (FIG. 9e) and which may also include an Authentication Word (FIG. 9d). The PCRM is transmitted by the mobile station 10 to the base station 26 in a RECC message, and indicates the air-interface protocol version(s) and the core analog roaming standard version(s) supported by the mobile station 10, and also indicates the capability features supported/not supported by the mobile station 10, as will be described below.

Words A and B of FIGS. 9b and 9c have data fields that are similar to those of prior art Words A and B of FIGS. 6a and 6b, respectively. The Authentication Word C of FIG. 9d has data fields that are similar to those of prior art Word C shown in FIG. 6e. The data fields of Words A and B of the Protocol Capability Registration Message may include values that are determined and specified in accordance with, by example, Standard EIA/TIA-553-A. For example, the possible values of the MSGTYPE (Message Type), ORDER (Order code), and ORDQ (Order Qualification code) data fields may include the values shown in Table 3.7.1-1 of Standard EIA/TIA-553-A. In accordance with the invention, additional possible values are provided for the MSGTYPE, ORDER, and ORDQ data fields. In particular, and in accordance with a presently preferred embodiment of the invention, the additional possible values of these data fields are shown in Table 2.

TABLE 2

| ORDER | ORDQ | MSG_TYPE | FUNCTION |
|---|---|---|---|
| 01101 | 011 | 00101 | Protocol Capability response - Authentication word C not included |
| 11000 | 011 | 00101 | Protocol Capability response - Authentication word C included |

As can be appreciated, the values of ORDER, ORDQ, and MSG_TYPE indicate whether the Authentication Word C is included in the PCRM. Whether or not the Authentication Word C is included in the PCRM depends on whether or not the base station 26 supports authentication features, as is indicated by the base station 26 via an AUTH data field included in an SPOM of a transmitted OMT.

Referring to FIG. 9e, the First Word of the Protocol Capability Registration Message (FWPCRM) includes a data field "F", which indicates whether or not the FWPCRM is the first word of the PCRM, a data field "NAWC", which indicates the number of additional words coming, and a Parity field (P) (these fields are in accordance with, e.g., EIA/TIA Sec. 2.7.1.1). The FWPCRM also includes a Mobile Station Protocol Capability (MSPC) field and a Mobile Station Core Analog Roaming Protocol (MSCARP) field. In the presently preferred embodiment of the invention, the particular values of MSPC and MSCARP stored in sub-memory 24a respectively indicate the air-interface protocol version(s) and the core analog roaming protocol version(s) supported by the mobile station 10. The possible values for these fields may be interpreted as follows:

MSPC:
   00000—ANSI EIA/TIA 553 and earlier revisions, or IS-54A system,
   00001—ANSI EIA/TIA 627 or IS-54B dual-mode system,
   00010—IS-95a dual-mode system,
   01100—IS-136a dual-mode system,
   10110—ANSI EIA/TIA 691 dual-mole system,
   (other values are reserved);
MSCARP:
   000—EIA/TIA-553 and earlier revisions,
   001—EIA/TIA-533A,
   (other values are reserved).

Also in the presently preferred embodiment of the invention, the FWPCRM includes a Calling Line Identification (CLI) field, a Call Waiting (CWT) field, a Message Waiting Notification (MWN) field, an AA field, a Feature 1 field, a Feature 2 field, a Feature 3 field, and a Feature 4 field. The values of MSPC, MSCARP, CLI, CWT, MWN, AA, and Feature 1–4 for the mobile station 10 are stored in sub-memory 24a. The particular values of CLI, CWT, MWN, and AA stored in the sub-memory 24a indicate whether or not the mobile station 10 supports core analog capability features such as Calling Line/Number Identification (ID), Call Waiting, Message Waiting, and splash ringing via abbreviated alert (field AA), respectively. These capability features are defined in accordance with the version(s) of the core analog roaming protocol identified by the value of MSCARP stored in sub-memory 24a. The particular values of Features 1–4 stored in the sub-memory 24a indicate whether or not the mobile station 10 supports particular dual-mode functions. These functions are defined in accordance with the air-interface protocol version(s) indicated by the stored value of MSPC. It should be noted that in other embodiments of the invention, additional Feature fields may also be provided. The possible values of CLI, CWT, MWN, and AA in accordance with a presently preferred embodiment of the invention are as follows:

CLI:
 0—Calling Line ID via Alert with info not supported;
 1—Calling Line ID via Alert with info supported;
CWT:
 0—Call Waiting via Flash with info not supported;
 1—Call Waiting with Flash with info supported;
MWN:
 0—Message Waiting Notification not supported;
 1—Message Waiting Notification supported;
AA:
 0—Splash Ringing via abbreviated alert not supported;
 1—Splash Ringing via abbreviated alert supported.

Referring again to the block diagram of the mobile station 10 in FIG. 2, an operating program for controlling the operation of controller 18 is typically stored in a separate program memory (not shown). The controller 18 outputs a signal (TUNE) 18a to the transmitter 12 and the receiver 16 that is used for varying the transmit and receive frequencies, thereby enabling the mobile station to tune to various control and voice channels. When tuning to a desired channel the transmitter 14 and receiver 16 will normally be tuned so as to be separated by 45 MHz. A received signal strength indicator (RSSI) is provided from the receiver 16, and is useful in determining a strength of a received signal from, for example, a dedicated control channel and/or a paging channel.

Figure 7:
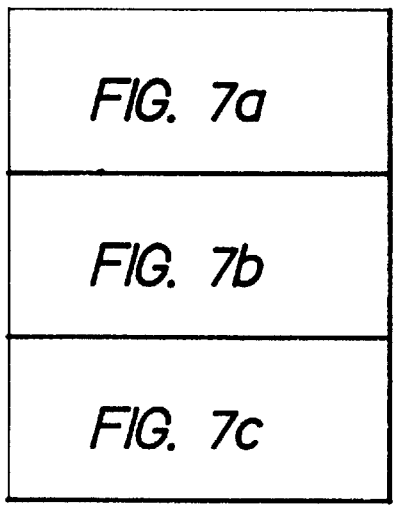
FIG. 7 illustrates the relationship between FIGS. 7a–7c.
Figure 7A:
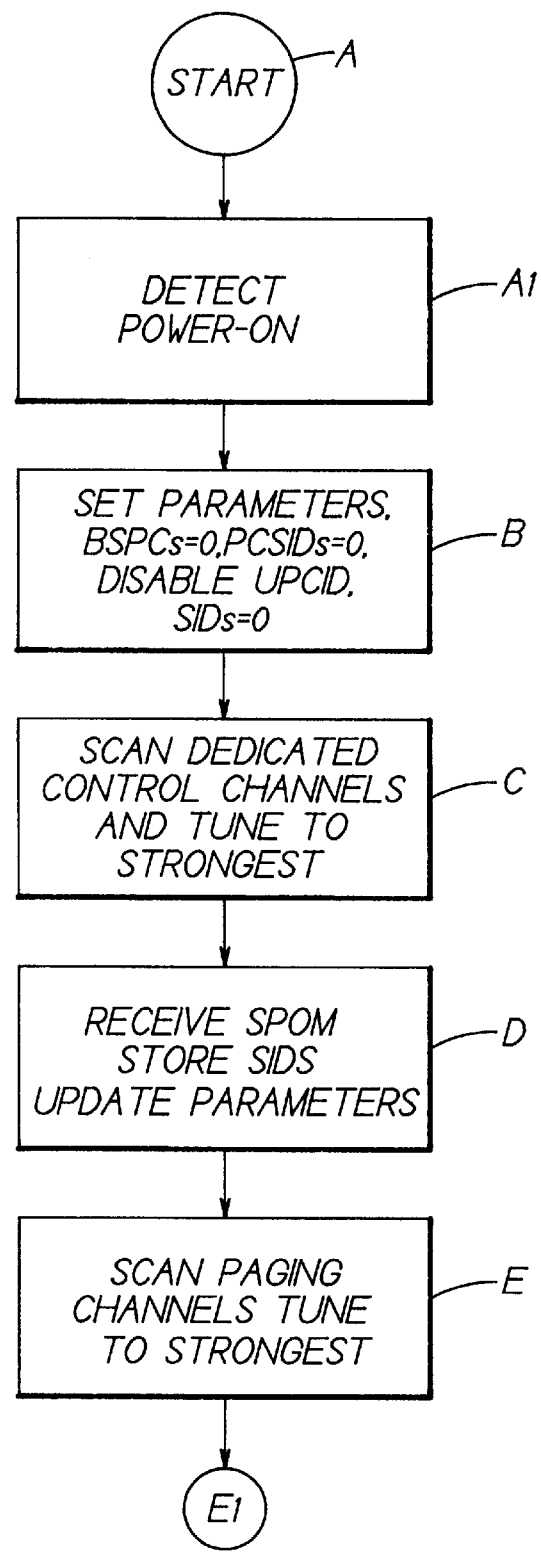
FIGS. 7a–7c illustrates a logic flow diagram that illustrates a method of this invention.
Figure 7B:
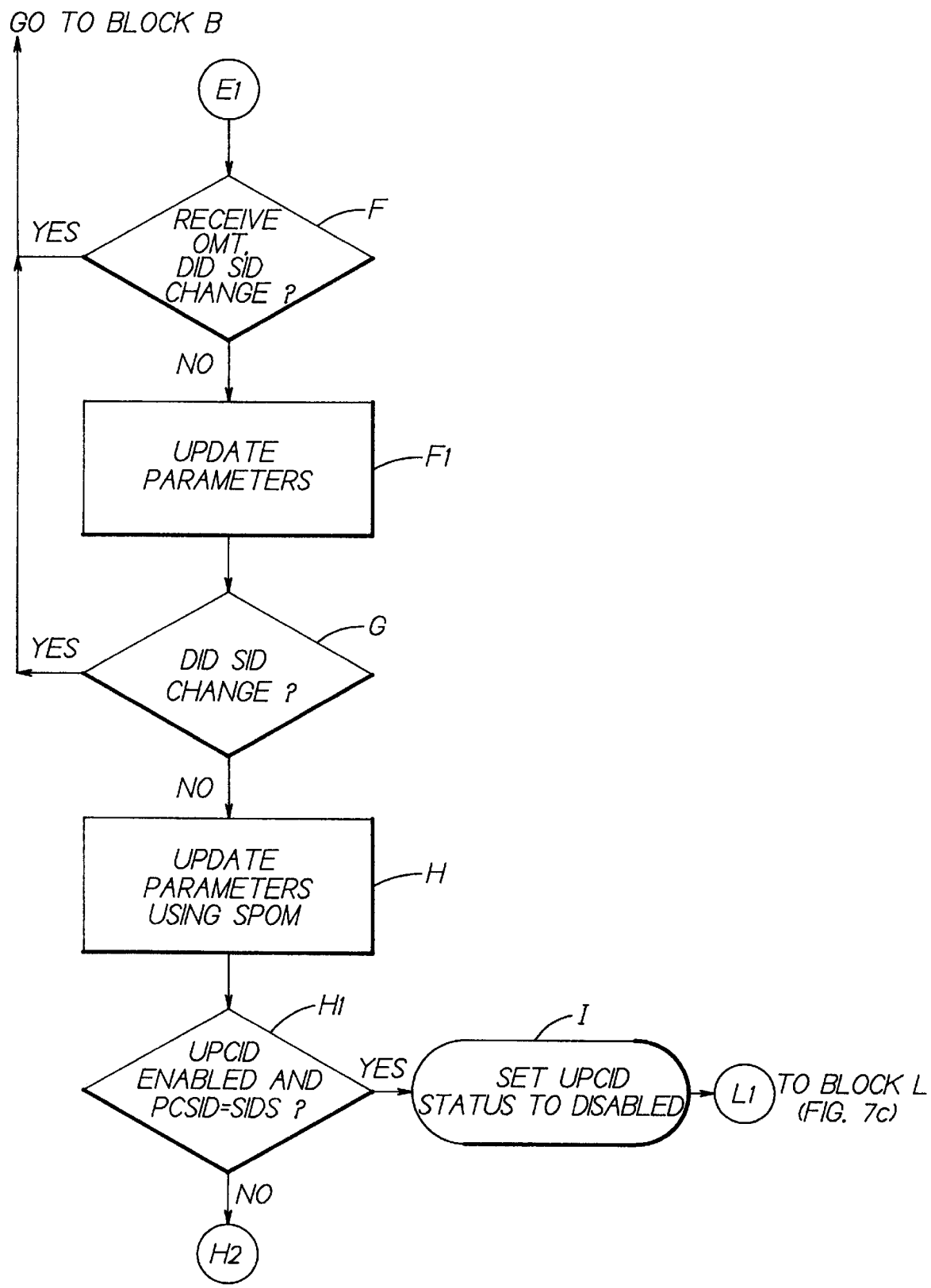
Figure 7C:
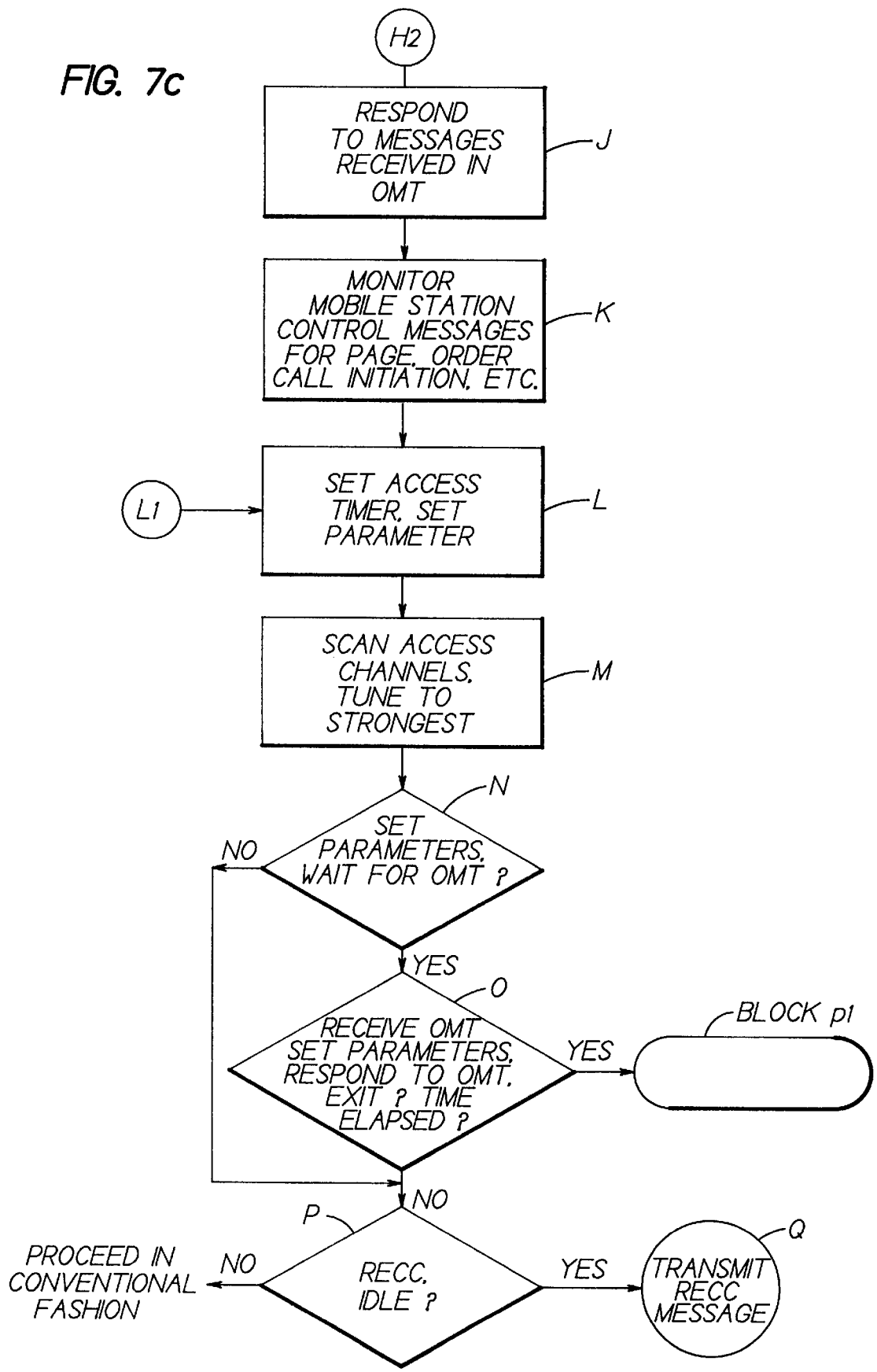

Reference is now made to the logic flow diagrams of FIGS. 7a–7c for illustrating a presently preferred method of this invention. The method starts at Block A. At Block A1 a power-on condition is sensed by the controller 18 (i.e., power is provided to the mobile station 10). At Block B, and in accordance with the invention, certain parameters are initialized. For example, the values of $PCSID_s$, $BSPC_s$, and $BSCARP_s$ stored in memory 24 are set to '0', and the UPCID status is disabled. Other parameters are also initialized in accordance with, by example, EIA/TIA-553-A Sec. 2.6.1.1 (Retrieve System Parameters). For example, the value of $SID_s$ is set to '0'. At Block C the mobile station 10 scans the set of dedicated control channels in accordance with, by example, the Scan Dedicated Control Channels task (e.g., EIA/TIA-553, Sec. 2.6.1.1.1). The mobile station 10 then tunes to the dedicated control channel having the highest signal strength.

At Block D the mobile station 10 enters the Update Overhead Information task and receives, within three seconds, a System Parameter Message (e.g., EIA/TIA-553, Sec. 2.6.1.1.2). See also Sec. 3.7.1.2.1, System Parameter Overhead Message (SPOM). The mobile station 10 stores the value of the SID from the SPOM in the memory 24 as variable SID, and updates certain specified parameters and performs certain specified tasks in accordance with, by example, the Update Overhead Information task (EIA/TIA-553 Sec. 2.6.1.1.2).

At Block E the mobile station 10 scans the set of paging channels and examines the signal strength of each channel in accordance with, by example, the Scan Paging Channels task (e.g., EIA/TIA 553 Sec. 2.6.1.2.1). The mobile station 10 then enters the Verify Overhead Information task (Sec. 2.6.1.2.2) and tunes to the strongest paging channel. Referring to Block F in FIG. 7b, within three seconds of tuning to the strongest paging channel, the mobile station 10 receives another OMT including another SPOM with a SID, and then determines if the received SID differs from the SID that was received and stored in Block D (see, e.g., EIA/TIA 553 Sec. 2.6.1.2.2). If Yes, control passes back to Block B, since it is indicated that the mobile station 10 has tuned to a paging channel from another system. If No at Block F, then the mobile station 10 updates various parameters from the newly-received SPOM at Block F1, and then enters the Idle task (Sec. 2.6.2).

During the Idle task, steps of Block G are performed. That is, whenever the mobile station 10 receives an OMT, the mobile station 10 determines if the SID from the SPOM of the received OMT differs from the value of SID, (see, e.g., EIA/TIA-553-A Sec. 2.6.2.1, Response to overhead information). If Yes at Block G, control passes back to Block B. If No at Block G, then control passes to Block H where the mobile station 10 updates various parameters using information contained in the SPOM of the received OMT and performs tasks in accordance with, by example, BIA/TIA-553-A Sec. 2.6.2.1. Next, at Block H1, and in accordance with this invention, if the mobile station 10 determines that the status of the UPCID stored in memory 24 is 'enabled' and the value of PCSID stored in memory 24 is equal to the value of the SID (e.g., $SID_s$) stored in memory 24 (i.e., indicating that the last PCRM sent by the mobile station 10 was transmitted to the base station indicated by the $SID_s$), then the UPCID status is disabled at Block I. After Block I, control is passed to Block L (FIG. 7c) where the System Access Task (e.g., EIA/TIA 553 Sec. 2.6.3) is entered with a "registration" indication to initiate a process for sending a PCRM from the mobile station 10 to the base station 26, as will be described below. As can be appreciated, the 'enabled' status of the UPCID specifies that the mobile station 10 initiate the process for transmitting the PCRM to the base station 26, even though the values of $SID_s$ and PCSID may be equal to one another (indicating that the last PCRM sent by the mobile station 10 was transmitted to the base station indicated by $SID_s$).

If at Block H1 the mobile station 10 determines that the status of the UPCID stored in memory 24 is not enabled and/or that the value of PCSID is not equal to the value of the $SID_s$, then control is passed to Block J (FIG. 7c). At Block J the mobile station 10 responds to specific messages received in the OMT by setting various parameters. If more than one of these messages are received in the OMT, the mobile station 10 responds to the messages in a specific order. By example, according to a presently preferred embodiment of the invention, the mobile station 10 responds to the following messages in order: (1) Local Control Messages, (2) a New Access Channel Set Message, (3) a Registration Increment Message, (4) a Location Area Message, (5) a Random Challenge A Message, (6) a Random Challenge B Message, (7) a Registration ID Message, (8) a Rescan Message, and, in accordance with the invention, (9) an Access Type Parameters Global Action Message (ATPGAM). Any other messages are then subsequently responded to. The mobile station 10 responds to the messages (1) to (8) in accordance with, by example, the Response to overhead information task (e.g., EIA/TIA-553-A Sec. 2.6.2.1).

Figure 8A:
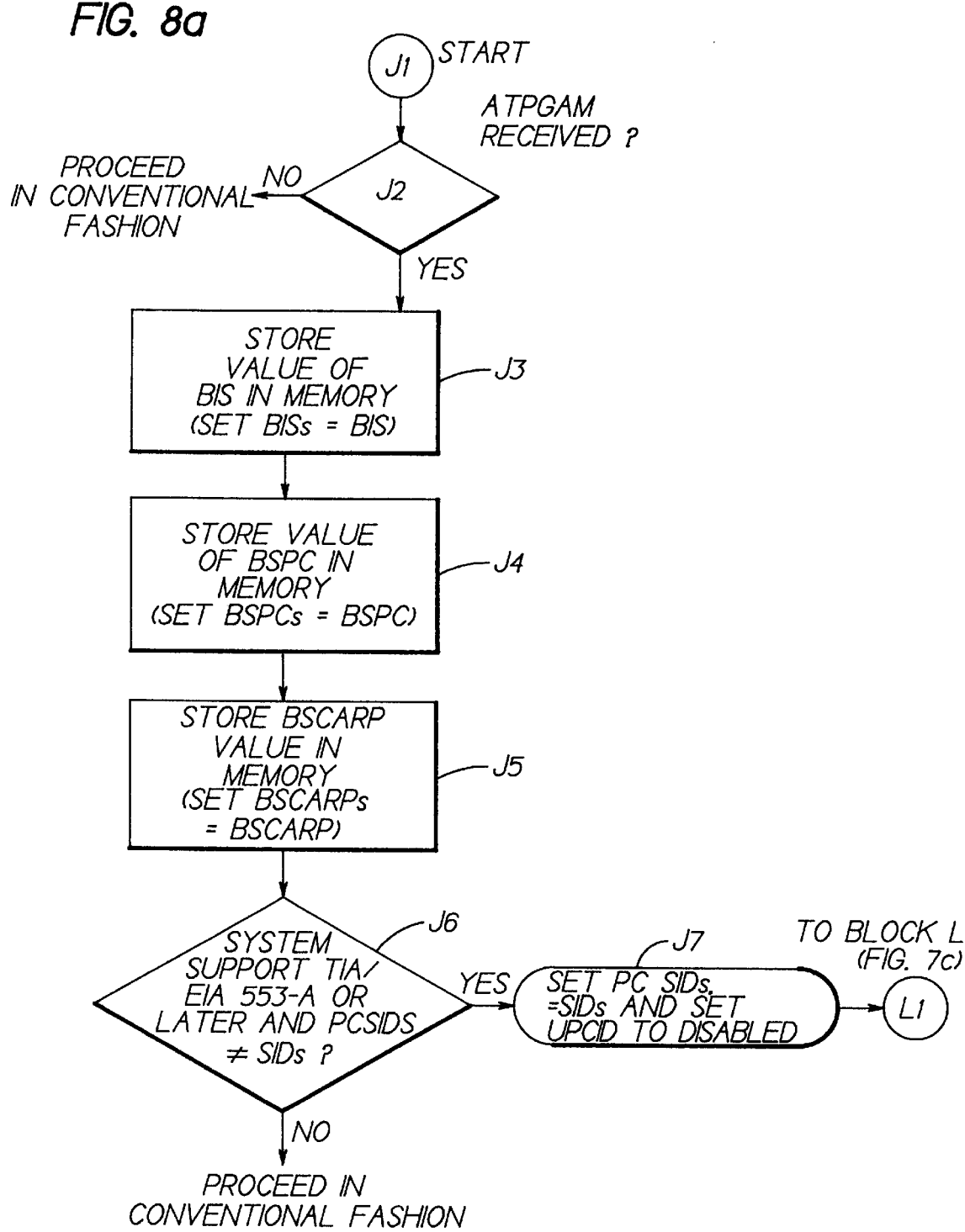
FIG. 8a is a logic flow diagram that illustrates in greater detail the function of the Block J of FIG. 7c.

The invention pertains most particularly to the mobile station 10 activity (at Block J) in response to the ATPGAM. Referring now to FIG. 8a, the steps performed by the mobile station 10 with regard to the ATPGAM are shown in greater detail. The steps start at Block J1 and then proceed to Block J2. At Block J2, assuming that no ATPGAM was received in the OMT (No), then the mobile station 10 proceeds in conventional fashion within the Response to overhead information task (Sec. 2.6.2.1), by responding to other messages, etc. If the ATPGAM was received in the OMT (Yes), then the mobile station 10 responds to the ATPGAM by performing the tasks at Blocks J3, J4, and J5. That is, at Block J3 the mobile station 10 stores the value of the busy-idle status BIS field of the received message in the memory 24 (i.e., $BIS_s$ is set equal to the value of BIS). At Block J4 the mobile station 10 stores the value of BSPC from the received message in the memory 24 (i.e., $BSPC_s$ is set equal to the value of BSPC), and at Block J5 the mobile station 10 stores the value of BSCARP from the received message in the memory 24 (i.e., $BSCARP_s$ is set; equal to the value of BSCARP).

Next, at Block J6 the mobile station 10 determines whether the stored value of BSCARP indicates that the system supports EIA/TIA-553-A or later versions of the core analog roaming standard, and if the value of $PCSID_s$ differs from the value of $SID_s$ (i.e., indicating that the last PCRM sent by the mobile station 10 was sent to a different base station than the one identified by the value of $SID_s$). If the determination is No at Block J6, then the mobile station 10 proceeds in conventional fashion within the Response to overhead information task (Sec. 2.6.2.1), by responding to other messages, etc. If the determination is Yes at Block J6, then the UPCID status is disabled and the value of $PCSID_s$ is set equal to the value of $SID_s$ (Block J7). Control then passes to Block L of FIG. 7c wherein the process for transmitting a PCRM is initiated by entering the System Access Task (Sec. 2.6.3) with a "registration" indication. The setting of the value of $PCSID_s$ equal to the value of $SID_s$ at Block J7 indicates that the base station identified by the value of $SID_s$ now becomes the base station to which the mobile station 10 last sent a PCRM.

Referring again to FIG. 7c, after the mobile station performs the steps of Block J, control passes to Block K. At Block K the mobile station 10 monitors mobile station control messages for page messages, orders, a user-initiated call, and a non-autonomous registration indication, and responds to detections of these messages in accordance with, by example, EIA/TIA 553 Sec. 2.6.2.2 (Page Match), Sec. 2.6.2.3 (Order), Sec. 2.6.2.4 (Call Initiation), and Sec. 2.6.2.5 (Non-Autonomous Registration Initiation), respectively. By example, if a page message is detected, the System Access task (e.g., EIA/TIA 553 Sec. 2.6.3) is entered at Block L with a "page response" indication. If an audit order is detected, the System Access task is entered at Block L with an "order" indication. If a call initiation is detected, the System Access task is entered at Block L with an "origination" indication. Also, if the mobile station initiates a non-autonomous registration, the System Access task is entered at Block L with a "registration" indication.

At Block L, the System Access task (e.g., EIA/TIA 553 Sec. 2.6.3) is started and, in accordance with, by example, the Set Access Parameters task (e.g., EIA/TIA 553 Sec. 2.6.3.1), an access timer and a parameter (e.g., a last-try code ($LT_s$)) are set. Then, control passes to Block M. At Block M the mobile station 10 scans the set of access control channels and tunes to the access channel having the strongest signal strength in accordance with, by example, the Scan Access Channels task (e.g., EIA/TIA 553 Sec. 2.6.3.2). Thereafter, at Block N the Retrieve Access Attempts Parameters task (e.g., Sec. 2.6.3.3) is entered. In accordance with this task, certain parameters are set and the mobile station 10 determines whether the mobile station 10 is to wait for an overhead message (e.g., indicated by a variable $WFOM_s$). If No at Block N, then the mobile station 10 waits for a random period of delay, and then enters the Seize Reverse Control Channel task (e.g., Sec. 2.6.3.5) at Block P, which will be described below.

If Yes at Block N, then the mobile station 10 enters Block O. At Block O the mobile station 10 receives another OMT, sets certain parameters, and performs certain processing tasks in accordance with, by example, the Update overhead information task (e.g., EIA/TIA-553-A Sec. 2.6.3.4). By example, in accordance with the Update overhead information task (e.g., EIA/TIA-553-A Sec. 2.6.3.4), if the access is a registration, a page response, or an origination, Block O may be exited and the Serving-System Determination Task (e.g., EIA/TIA-553 Sec. 2.6.3.12) may be entered at Block P1, based upon user preference or the quality of the received signal. Also in accordance with, by example, the Update overhead information task (e.g., EIA/TIA-553 Sec. 2.6.3.4), if the tasks performed at Block O are not completed within 1.5 seconds, Block P1 is entered where the mobile station 10 activity continues in conventional fashion in accordance with the Serving-System Determination Task (e.g., EIA/TIA-553 Sec. 2.6.3.12).

In the presently preferred embodiment of the invention, at Block O the mobile station 10 responds to the following global action messages, if received in the OMT: (1) an Overload Control Message, (2) an Access Type Parameters Message, (3) a Random Challenge A Message, (4) a Random Challenge B Message, and (5) an Access Attempt Parameters Global Action Message (ATPGAM). The manner in which the mobile station 10 responds to the messages (1) to (4) is in accordance with, by example, the Update overhead information task (e.g., Sec. 2.6.3.4).

Figure 8B:
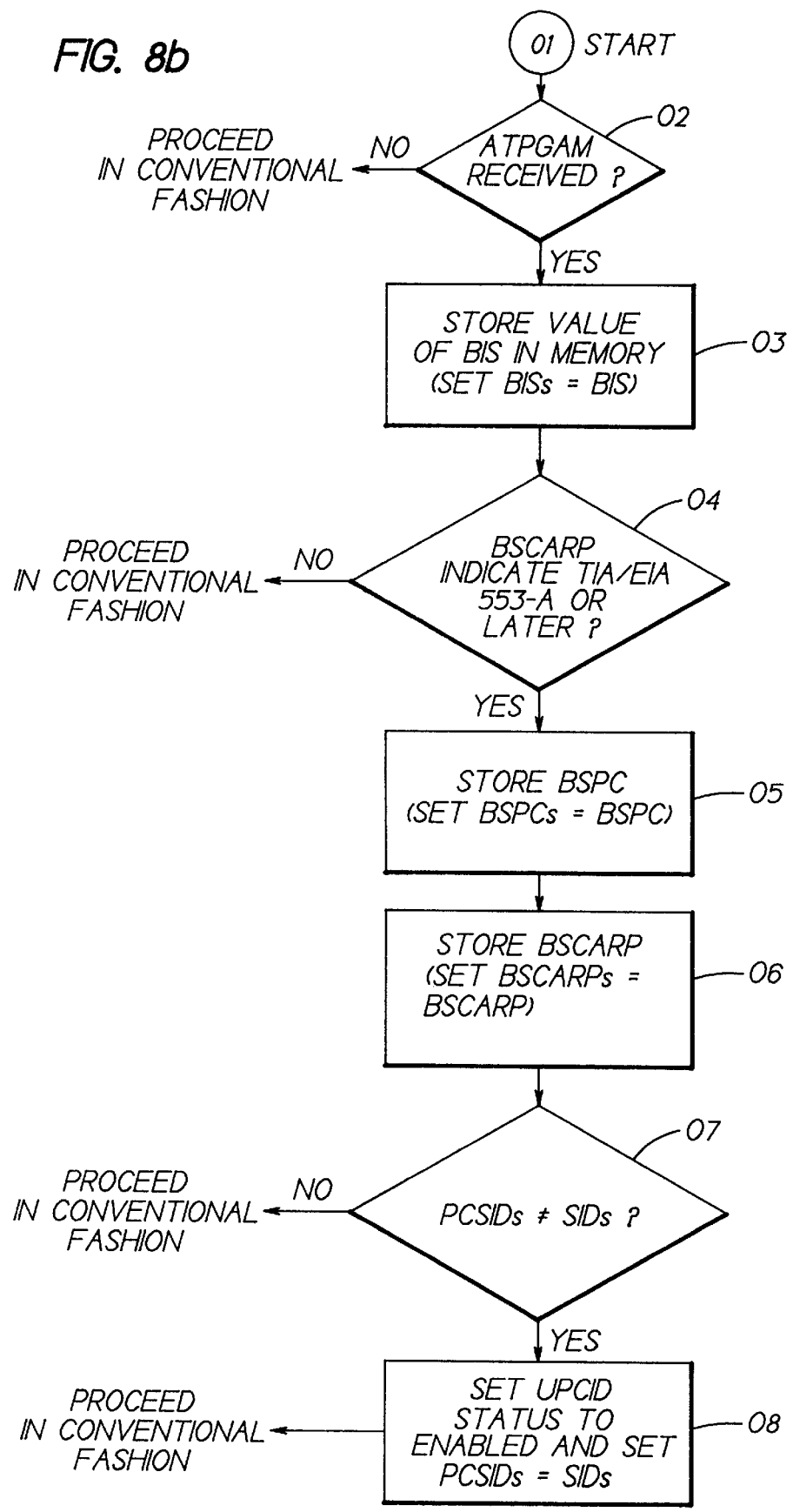
FIG. 8b is a logic flow diagram that illustrates in greater detail the function of the Block O of FIG. 7c.

The invention pertains most particularly to the mobile station 10 activity (at Block O) in response to the ATPGAM received in the OMT. Referring now to the logic flow diagram shown in FIG. 8b, the steps performed by the mobile station 10 with regard to the ATPGAM received in the OMT are shown in greater detail. The steps start at Block O1 and then proceed to Block O2. Assuming that the ATPGAM was not included in the OMT received at Block O, then the mobile station 10 proceeds in conventional fashion within the Update overhead information task (Sec. 2.6.3.4) by responding to other received messages, etc. Assuming that the ATPGAM was received in the OMT received at Block O, then Block O3 is entered. At Block O3 the value of BIS from the received ATPGAM is stored in memory 24 of the mobile station 10 (i.e., the value of $BIS_s$ is set equal to the value of BIS from the received ATPGAM).

At Block O4 the mobile station 10 determines whether the value of BSCARP from the received message indicates that the system supports EIA/TIA-553-A or later revisions of the core analog roaming standard. If the determination result is No at Block O4, then the mobile station 10 proceeds in conventional fashion within the Update overhead information task (Sec. 2.6.3.4), by responding to other received messages, etc. If the determination result is Yes at Block O4, then Block O5 is entered. At Block O5 the value of BSPC from the received ATPGAM is stored in the mobile station's memory 24 (i.e., $BSPC_s$ is set equal to the value of BSPC).

A next step at Block O6 includes storing the value of BSCARP from the received message in the memory 24 (i.e., setting $BSCARP_s$ equal to the value of BSCARP). At Block O7 the mobile station 10 determines if the value of $PCSID_s$ stored in memory 24 differs from the value of $SID_s$ stored in memory 24 (i.e., indicating that the last PCRM sent by the mobile station was transmitted to a different base station than the one identified by $SID_s$). If the determination results in No at Block O7, then the mobile station 10 proceeds in a conventional a fashion within the Update overhead information task (Sec. 2.6.3.4). If the determination results in Yes at Block O7 then control is passed to Block O8.

At Block O8 the UPCID status is enabled and the value of $PCSID_s$ is set equal to the value of $SID_s$. This indicates that the base station identified by the value of $SID_s$ is now to be identified as the base station to which the mobile station 10 last sent a PCRM. The mobile station 10 then proceeds in conventional fashion within the Update overhead information task (Sec. 2.6.3.4).

Figure 4B:
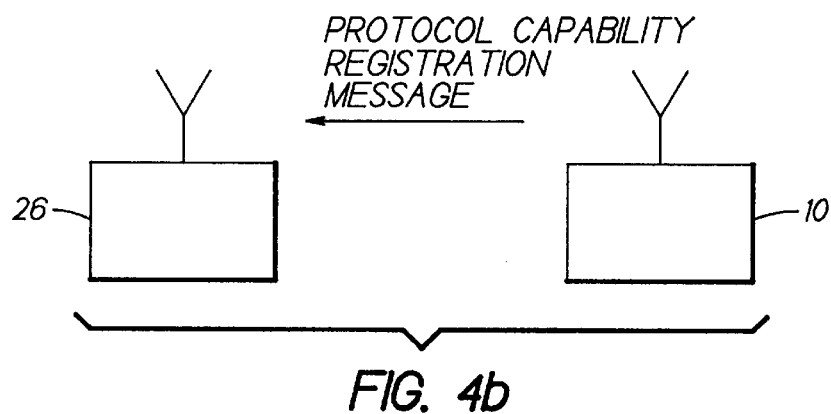
FIG. 4b illustrates a Protocol Capability Registration Message (PCRM) being transmitted from a mobile station to a base station.

Referring again to FIG. 7c, after the steps of Block O are performed Block P is entered. At Block P the mobile station 10 determines whether or not the reverse control channel is idle in accordance with, by example, the Seize Reverse Control Channel task (EIA/TIA 553 Sec. 2.6.3.5). If the reverse control channel is determined to be busy at Block P, then the activity of the mobile station proceeds in conventional fashion in accordance with the Seize Reverse Control Channel task (EIA/TIA 553 Sec. 2.6.3.5). If the reverse control channel is determined to be idle at Block P, then control passes to Block Q, and the controller 18 of the mobile station controls the transmitter 14 to turn on. Then, after a period of delay until the transmitter power is within, for example, 3 dB of a required power level, the controller 18 controls the transmitter 14 to transmit a reverse control channel (RECC) message, including the PCRM, to the base station 26 (see FIG. 4b). Thereafter, the activity of the mobile station continues in accordance with, by example, the Delay After Failure Task (e.g., Sec. 2.6.3.6), the Service Request task (e.g., Sec. 2.6.3.7), the Await Message task (e.g., Sec. 2.6.3.8), etc.

As was described above, the PCRM of the transmitted RECC message indicates the particular air-interface protocol version(s) and the particular version(s) of the core analog roaming protocol supported by the mobile station 10, and also indicates the particular capability features supported/not supported by the mobile station 10. As such, after the base station 26 receives the PCRM, it can identify the protocols supported by the mobile station 10 and the capability features supported/not supported by the mobile station 10.

Having described the method of the invention, reference is now made to FIG. 10a, which shows an example of an ATPGAM transmitted from the base station 26 to the mobile station 10. As can be appreciated, in this example the value '10110' of the BSPC field indicates that the air-interface protocol supported by the base station 26 is EIA/TIA-691 (IS-91), and the value "001" of BSCARP indicates that the base station 26 supports the EIA/TIA-553-A core analog roaming standard.

FIGS. 10b–10d show an example of the Protocol Capability Registration Message (PCRM) transmitted from the mobile station 10 in response to receiving the ATPGAM from the base station 26. The Abbreviated Address Word (Word A) is shown in FIG. 10b, the Extended Address Word (Word B) is shown in FIG. 10c, the Authentication Word (Word C) is shown in FIG. 10d, and the First Word of the Protocol Capability Registration Message (Word C) is shown in FIG. 10e. In this example, and as can be seen in view of FIG. 10c and the values of MSGTYPE, ORDQ, and ORDER described above, the values of MSGTYPE, ORDQ, and ORDER indicate that the Authentication Word (Word C) is included in the PCRM. Also, as can be seen in view of FIG. 10e, the value of '00000' for MSPC indicates that the mobile station 10 supports the EIA/TIA-691 Dual Mode Protocol Version, and the value '001' of MSCARP indicates that the mobile station 10 supports the EIA/TIA-553-A version of the core analog roaming standard. Also, the CLI field indicates that the mobile station 10 supports Calling Line Identification core analog features, and the MWN field indicates that Message Waiting Notification is supported by the mobile station 10. Furthermore, the value '1' of the Feature 1 field indicates that Dual-Mode Feature 1 is supported by the mobile station 10. The values of '0' in the CWT and AA fields indicate that Call Waiting and splash ringing/abbreviated alert are not supported by the mobile station 10.

Figure 11A:
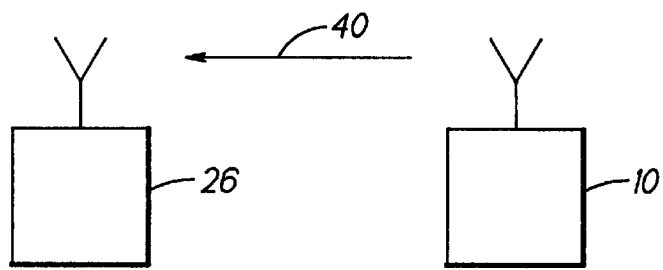
FIGS. 11a–11e illustrate examples of messages being transmitted between a base station and a mobile station in accordance with a method of the invention.

Another example of the method in accordance with a presently preferred embodiment will now be described. Referring to FIG. 11a, the mobile station 10 can request the system for Voice Privacy by transmitting to the base station 26 an origination message 40 that includes Extended Word Address (Word B) having the following values for the ORDER, ORDQ, and MSGTYPE fields.

ORDER=00000;

ORDQ=100;

MSGTYPE=00000—Voice Privacy Algorithm A or 00001—Private Algorithm defined by the ATPGAM of a received OMT.

Figure 11B:
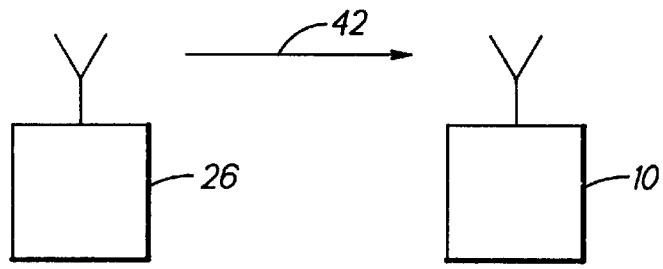

Referring to FIG. 11b, in response to receiving the origination message 40, the base station 26 transmits an Initial Voice Channel Designation (IVCD) 42 message over the forward control channel to the mobile station 10. The IVCD message 42 includes a First Analog Channel Assignment Word having data fields (with associated numbers of bits) as shown in Table 3. The message 42 also includes the following values for the ORDER, ORDQ, and MSGTYPE fields.

ORDER=01110;

ORDQ=010;

MSGTYPE=00001

TABLE 3

| First Analog Channel Assigmnent Word | |
|---|---|
| Field | Length (bits) |
| T1T2 = 10 | 2 |
| Voice Privacy System (VPS) | 2 |
| RSVD = 0.0 | 8 |
| SCC | 2 |
| VMAC | 3 |
| CHAN | 11 |
| P | 12 |

The possible values of the Voice Privacy System data field are as follows.

00—No Voice Privacy is supported;
01—Voice Privacy Algorithm A;
10—Private Voice Privacy.

Figure 11C:
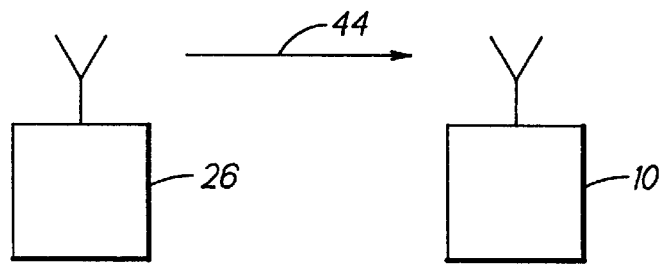

As another example, and referring to FIG. 11c, the base station 26 can notify the mobile station 10 that an originator of a call has requested Voice Privacy. In this example, the base station 26 sends a page message 44 to the mobile station 10 indicating that the originator of the call has turned on Voice Privacy. Word B of the page message 44 includes the following values for ORDER, ORDQ, and MSGTYPE.

ORDER=00000;

ORDQ=000;

MSGTYPE=00011—indicates that the originator of the call has Voice Privacy turned on.

Figure 11D:
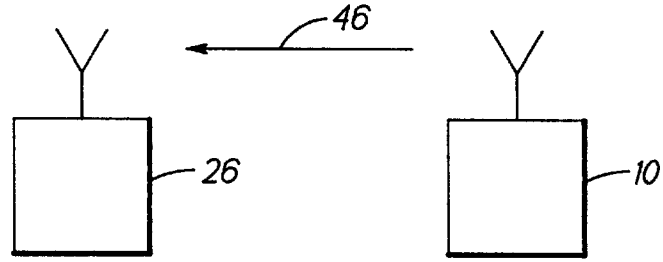
Figure 11E:
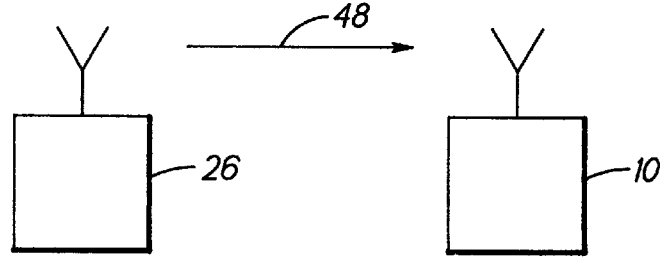

Referring to FIG. 11d, in response to receiving the page message 44, the mobile station can transmit a page response message 46 to the base station 26 which indicates that the mobile station 10 requests Voice Privacy. For this case, Word B of the page response message 46 has the following values for the ORDER and ORDQ data fields.

ORDER=00000;

ORDQ=100;

Word B of the page response message 46 may have one of the following values for the MSGTYPE field, indicating the Voice Privacy Algorithm.

MSGTYPE=00000—Voice Privacy Algorithm A or 00001—Private Algorithm defined by the ATPGAM of the received message.

As can be appreciated, the mobile station 10 does not have to receive the page message indicating that the call originator has Voice Privacy turned on in order to respond with the page response message. That is, the mobile station 10 may originate the page response.

Referring to FIG. 11d, in response to receiving the page response message 46 from the mobile station 10, the base station 26 sends an IVCD message 48 indicating whether or not Voice Privacy has been turned, as was described above.

While the invention has been particularly shown and described with respect to preferred embodiments thereof, it will be understood by those skilled in the art that changes in form and details may be made therein without departing from the scope and spirit of the invention.

What is claimed is:

1. A method for exchanging protocol support information between a base station and a mobile station over at least one analog control channel, comprising the steps of:

transmitting first information from the base station over a first analog control channel, the first information specifying at least one protocol supported by the base station; and receiving the transmitted first information at the mobile station and, in response thereto, transmitting second information from the mobile station to the base station over a second analog control channel, the second information specifying at least one protocol supported by the mobile station;

wherein prior to the performance of the step of receiving, steps are performed of detecting a power-on condition of the mobile station; and initializing values of variables Protocol Capability System Id ($PCSID_s$), Base Station Protocol Capability ($BSPC_s$), and Base Station Core Analog Roaming Protocol ($BSCARP_s$) stored in a memory of the mobile station.

2. A method as set forth in claim 1, wherein the at least one protocol supported by the base station includes at least one of a predefined air-interface protocol and a predefined core analog roaming protocol supported by the base station.

3. A method as set forth in claim 1, wherein the at least one protocol supported by the mobile station includes at least one of a predefined air-interface protocol and a predefined core analog roaming protocol supported by the mobile station.

4. A method as set forth in claim 1, wherein the second information also specifies function capability features that are supported by the mobile station.

5. A method as set forth in claim 1, wherein the second information also specifies function capability features that are not supported by the mobile station.

6. A method as set forth in claim 4, wherein the function capability features include at least one of core analog protocol-related functions and dual-mode protocol-related functions.

7. A method for exchanging protocol support information between a base station and a mobile station over at least one analog control channel, comprising the steps of:

transmitting first information from the base station over a first analog control channel, the first information specifying at least one protocol supported by the base station; and receiving the transmitted first information at the mobile station and, in response thereto, transmitting second information from the mobile station to the base station over a second analog control channel, the second information specifying at least one protocol supported by the mobile station;

wherein the second information also specifies function capability features that are supported by the mobile station;

wherein the function capability features include at least one of core analog protocol-related functions and dual-mode protocol-related functions; and wherein the core analog protocol-related functions include Calling Line Identification, Call Waiting, splash ringing with abbreviated alert, and Message Waiting.

8. A method as set forth in claim 1, wherein, for a case in which the second information specifying the at least one protocol supported by the mobile station was already transmitted by the mobile station to the base station, the mobile station does not respond to receiving the first information by again transmitting the second information.

9. A method as set forth in claim 1, wherein the step of transmitting the first information includes transmitting an Overhead Message Train (OMT) from the base station, the OMT including a Global Action Overhead Message (GAOM), the GAOM including an Action Type Parameters Global Action Message (ATPGAM) specifying the at least one protocol supported by the base station.

10. A method for exchanging protocol support information between a base station and a mobile station over at least one analog control channel, comprising the steps of:

transmitting first information from the base station over a first analog control channel, the first information specifying at least one protocol supported by the base station; and receiving the transmitted first information at the mobile station and, in response thereto, transmitting second information from the mobile station to the base station over a second analog control channel, the second information specifying at least one protocol supported by the mobile station;

wherein the step of transmitting the first information includes transmitting an Overhead Message Train (OMT) from the base station, the OMT including a Global Action Overhead Message (GAOM), the GAOM including an Action Type Parameters Global Action Message (ATPGAM) specifying the at least one protocol supported by the base station; and wherein the ATPGAM includes a Base Station Protocol Capability (BSPC) data field specifying at least one predefined air-interface protocol supported by the base station, and wherein the ATPGAM further includes a Base Station Core Analog Roaming Protocol (BSCARP) data field specifying at least one core analog roaming protocol supported by the base station.

11. A method as set forth in claim 1, wherein the second information includes a Reverse Control Channel (RECC) message, the RECC message including a Protocol Capability Registration Message (PCRM) that includes at least three Words, one of the Words including a First Word of the Protocol Capability Registration Message (FWPCRM) that specifies the at least one protocol supported by the mobile station.

12. A method as set forth in claim 11, wherein other ones of the Words of the PCRM include at least one of an Abbreviated Address Word (Word A), an Extended Address Word (Word B), and an Authentication Word (Word C).

13. A method for exchanging Protocol support information between a base station and a mobile station over at least one analog control channel, comprising the steps of:

transmitting first information from the base station over a first analog control channel, the first information specifying at least one protocol supported by the base station; and receiving the transmitted first information at the mobile station and, in response thereto, transmitting second information from the mobile station to the base station over a second analog control channel, the second information specifying at least one protocol supported by the mobile station;

wherein the second information includes a Reverse Control Channel (RECC) message, the RECC message including a Protocol Capability Registration Message (PCRM) that includes at least three Words, one of the Words including a First Word of the Protocol Capability Registration Message (FWPCRM) that specifies the at least one protocol supported by the mobile station;

wherein other ones of the Words of the PCRM include at least one of an Abbreviated Address Word (Word A), an Extended Address Word (Word B), and an Authentication Word (Word C); and wherein the Extended Address Word (Word B) includes information specifying whether or not the Authentication Word (Word C) is included in the PCRM.

14. A method as set forth in claim 13, wherein the information specifying whether or not the Authentication Word (Word C) is included in the PCRM is specified by an ORDER data field, an ORDQ data field, and a MSG_TYPE data field of the Extended Address Word (Word B).

15. A method as set forth in claim 11, wherein the FWPCRM includes information specifying whether the FWPCRM is the first word of the PCRM, and whether other words follow the FWPCRM in the PCRM.

16. A method for exchanging protocol support information between a base station and a mobile station over at least one analog control channel, comprising the steps of:

transmitting first information from the base station over a first analog control channel, the first information specifying at least one protocol supported by the base station; and receiving the transmitted first information at the mobile station and, in response thereto, transmitting second information from the mobile station to the base station over a second analog control channel, the second information specifying at least one protocol supported by the mobile station;

wherein the second information includes a Reverse Control Channel (RECC) message, the RECC message including a Protocol Capability Registration Message (PCRM) that includes at least three Words, one of the Words including a First Word of the Protocol Capability Registration Message (FWPCRM) that specifies the at least one protocol supported by the mobile station; and wherein the FWPCRM includes at least one of a Mobile Station Protocol Capability (MSPC) data field, a Mobile Station Core Analog Roaming Protocol (MSCARP) data field, a Calling Line Identification (CLI) data field, a Call Waiting (CWT) data field, a Message Waiting Notification (MWN) data field, an AA data field, and at least one dual-mode function information field, the MSPC data field specifying at least one air-interface protocol supported by the mobile station, the MSCARP data field specifying at least one core analog roaming protocol supported by the mobile station, the CLI field specifying whether or not the mobile station supports a Call Waiting function, the CWT data field specifying whether or not the mobile station supports a Call Waiting function, the MWN data field specifying whether or not the mobile station supports a Message Waiting function, the AA data field specifying whether or not the mobile station supports a splash ringing with abbreviated alert function, and the at least one dual-mode function information field specifying whether or not the mobile station supports at least one predefined dual-mode function.

17. A method as set forth in claim 1, wherein subsequent to the performance of the step of initializing, steps are performed by the mobile station of:

executing a Scan Dedicated Control Channels task and tuning to a strongest dedicated control channel;

receiving a first Overhead Message Train (OMT) including a first System Parameter Overhead Message (SPOM), from the strongest dedicated control channel;

storing a System Identification (SID) from the first SPOM;

executing a Scan Paging Channels task and tuning to a strongest paging channel;

receiving a second OMT from the strongest paging channel, the second OMT including a second SPOM;

comparing a SID from the second SPOM to the stored SID; and if they are equal, entering an Idle task; and if they are not equal, re-executing the Scan Dedicated Control Channels task.

18. A method as set forth in claim 17, wherein if the Idle task is entered, steps are performed by the mobile station of:

determining if a SID from an SPOM of a received OMT is equal to the stored SID; and if they are equal, updating parameters stored in the memory using information contained in the SPOM in accordance with a Response to Overhead Information task;

determining (a) whether information specifying the at least one protocol supported by the mobile station was last transmitted by the mobile station to a base station identified by the stored SID, and (b) whether a status of a variable Update Protocol Capability Identifier (UPCID) stored in the memory is enabled; and if (a) and (b) are true, disabling the status of the variable UPCID; and entering a System Access Task with a registration indication.

19. A method as set forth in claim 18, wherein if the SID from the SPOM is not equal to the stored SID, a step is performed of re-executing the Scan Dedicated Control Channels task.

20. A method as set forth in claim 18, wherein if at least one of (a) and (b) is not true, steps are performed by the mobile station of:

determining whether an Access Type Parameters Global Action Message (ATPGAM) was included in the OMT, the ATPGAM specifying the first information; and if it is determined that the ATPGAM was included in the received OMT, the mobile station responds by performing the steps of:

storing a value of a busy-idle status (BIS) field from the received OMT;

storing, in the memory, the first information specifying the at least one protocol supported by the base station;

determining (c) whether the first information indicates that the base station supports a predetermined core analog roaming protocol, and (d) whether the information specifying the at least one protocol supported by the mobile station was last transmitted by the mobile station to a different base station than that identified by the SID from the received OMT; and if (c) and (d) are true, enabling the status of the variable UPCID;

setting the variable $PCSID_s$ equal to the value of the SID from the received OMT; and entering a System Access Task with a registration indication.

21. A method as set forth in claim 20, wherein if at least one of (c) and (d) is not true, then the mobile station responds by performing the step of:

responding to messages in the received OMT in accordance with a Response to Overhead Information task.

22. A method as set forth in claim 1, and wherein the mobile station further performs the steps of:

monitoring mobile station control messages for at least one of page responses, orders, a user-initiated call, and a non-autonomous registration indication; and responding to detected ones of these messages by executing a Page Match task, an Order task, a Call Initiation task, and a Non-Autonomous Registration Initiation task, respectively;

executing a System Access task;

scanning a set of access control channels and tuning to a strongest access channel in accordance with a Scan Access Channels task;

executing a Retrieve Access Attempts Parameters task and determining whether the mobile station shall receive an Overhead Message Train (OMT); and if the mobile station shall receive the OMT, receiving the the OMT, including a System Identification (SID);

determining whether an Access Type Parameters Global Action Message (ATPGAM) is included in the OMT, the ATPGAM specifying the first information; and if it is determined that the ATPGAM is included in the OMT, the mobile station responds by performing the steps of:

storing a value of a busy-idle status (BIS) field from the OMT;

determining (e) whether the first information from the OMT indicates that the base station that transmitted the OMT supports a predetermined core analog roaming protocol, and if (e) is true, storing, in the memory, the first information from the OMT;

determining (f) whether the information specifying the at least one protocol supported by the mobile station was last transmitted by the mobile station to a different base station than that which transmitted the OMT, and if (f) is true, enabling the status of a variable Update Protocol Capability Identifier (UPCID);

setting the variable $PCSID_s$ equal to the value of the SID; and executing a Seize Reverse Control Channel task and determining if the reverse control channel is idle, and if it is determined that the reverse control channel is idle, performing the step of transmitting the second information from the mobile station to the base station.

23. A method as set forth in claim 20, wherein the predetermined core analog roaming protocol includes standard EIA/TIA-553-A or later revisions thereof.

24. A method as set forth in claim 22, wherein the predetermined core analog roaming protocol includes standard EIA/TIA-553-A or later revisions thereof.

25. A cellular telecommunications system, comprising:

at least one base station;

at least one mobile station capable of bi-directional wireless communications with said base station, said mobile station comprising a memory for storing variables comprised of a Protocol Capability System Id ($PCSID_s$), a Base Station Protocol Capability ($BSPC_s$), and a Base Station Core Analog Roaming Protocol ($BSCARP_s$); and first control means coupled to said base station and second control means coupled to said mobile station for exchanging protocol support information therebetween, said first control means for transmitting first information from the base station over a first analog control channel, the first information specifying at least one protocol supported by the base station, and said second control means being responsive to receiving the transmitted first information for transmitting second information from the mobile station to the base station over a second analog control channel, the second information specifying at least one protocol supported by the mobile station; wherein said mobile station is responsive to detecting a power-on condition for initializing values of said variables $PCSID_s$, $BSPC_s$, and $BSCARP_s$ that are stored in said memory.

26. A system as set forth in claim 25, wherein the at least one protocol supported by the base station includes at least one of a predefined air-interface protocol and a predefined core analog roaming protocol supported by the base station.

27. A system as set forth in claim 25, wherein the at least one protocol supported by the mobile station includes at least one of a predefined air-interface protocol and a predefined core analog roaming protocol supported by the mobile station.

28. A system as set forth in claim 25, wherein the second information also specifies function capability features that are supported by the mobile station.

29. A system as set forth in claim 25, wherein the second information also specifies function capability features that are not supported by the mobile station.

30. A radiotelephone, comprising:
- an RF transceiver for conducting bidirectional wireless communications with a base station;
- a memory for storing variables comprised of a Protocol Capability System Id ($PCSID_s$), a Base Station Protocol Capability ($BSPC_s$), and a Base Station Core Analog Roaming Protocol ($BSCARP_s$); and
- a controller coupled to said transceiver and to said memory for exchanging protocol support information with said base station via said RF transceiver, said RF transceiver receiving first information from said base station over a first analog control channel, said first information specifying at least one protocol supported by said base station, and said controller being responsive to receiving said first information for transmitting second information to said base station through said transceiver over a second analog control channel, said second information specifying at least one protocol supported by said radiotelephone; wherein
- said radiotelephone is responsive to detecting a power-on condition of said radiotelephone for initializing values of said variables $PCSID_s$, $BSPC_s$, and $BSCARP_s$ that are stored in said memory.

31. A radiotelephone as in claim 30, wherein said at least one protocol supported by said base station includes at least one of a predefined air-interface protocol and a predefined core analog roaming protocol supported by said base station.

32. A radiotelephone as in claim 30, wherein said at least one protocol supported by said radiotelephone includes at least one of a predefined air-interface protocol and a predefined core analog roaming protocol supported by said radiotelephone.

33. A radiotelephone as set forth in claim 30, wherein said second information also specifies function capability features that are supported by said radiotelephone.

34. A radiotelephone as set forth in claim 30, wherein said second information also specifies function capability features that are not supported by said radiotelephone.

* * * * *